US008701184B2

(12) United States Patent
Morimoto

(10) Patent No.: US 8,701,184 B2
(45) Date of Patent: Apr. 15, 2014

(54) AUTHENTICATION APPARATUS, AUTHENTICATION METHOD, AND COMPUTER-READABLE RECORDING MEDIUM STORING AUTHENTICATION PROGRAM

(75) Inventor: Toshimitsu Morimoto, Osaka (JP)

(73) Assignee: Kyocera Mita Corporation (JP)

( * ) Notice: Subject to any disclaimer, the term of this patent is extended or adjusted under 35 U.S.C. 154(b) by 1273 days.

(21) Appl. No.: 12/164,459

(22) Filed: Jun. 30, 2008

(65) Prior Publication Data

US 2009/0013403 A1 Jan. 8, 2009

(30) Foreign Application Priority Data

Jul. 6, 2007 (JP) .................................. 2007-178667

(51) Int. Cl.
*G06F 7/04* (2006.01)

(52) U.S. Cl.
USPC ........ 726/19; 726/5; 726/16; 726/17; 726/18; 713/155; 713/182; 713/183; 713/184; 713/186; 380/247; 380/248; 380/249; 380/250

(58) Field of Classification Search
USPC .................. 726/2–5, 16, 17, 19, 21; 713/155, 713/182–184, 186; 380/247–250
See application file for complete search history.

(56) References Cited

U.S. PATENT DOCUMENTS

| 5,661,807 | A | * | 8/1997 | Guski et al. | 713/159 |
|---|---|---|---|---|---|
| 5,793,952 | A | * | 8/1998 | Limsico | 726/18 |
| 5,889,866 | A | * | 3/1999 | Cyras et al. | 713/192 |
| 5,949,882 | A | * | 9/1999 | Angelo | 713/185 |
| 6,088,450 | A | * | 7/2000 | Davis et al. | 713/182 |
| 6,598,167 | B2 | * | 7/2003 | Devine et al. | 726/8 |
| 7,200,761 | B1 | * | 4/2007 | Freeman et al. | 713/184 |
| 7,240,037 | B1 | * | 7/2007 | Bussell | 705/75 |
| 7,350,701 | B2 | | 4/2008 | Miyashita | |
| 7,836,310 | B1 | * | 11/2010 | Gutnik | 713/183 |
| 2003/0188171 | A1 | * | 10/2003 | DeCenzo et al. | 713/185 |
| 2004/0054929 | A1 | * | 3/2004 | Serpa | 713/202 |
| 2004/0172531 | A1 | * | 9/2004 | Little et al. | 713/155 |
| 2004/0221170 | A1 | * | 11/2004 | Colvin | 713/193 |
| 2007/0031009 | A1 | * | 2/2007 | Mwale | 382/115 |
| 2007/0143626 | A1 | * | 6/2007 | Okuda | 713/183 |
| 2007/0300292 | A1 | * | 12/2007 | Scipioni et al. | 726/5 |
| 2008/0162930 | A1 | * | 7/2008 | Finney et al. | 713/165 |
| 2009/0300190 | A1 | * | 12/2009 | Williamson et al. | 709/227 |

FOREIGN PATENT DOCUMENTS

| JP | 2003-87477 | 3/2003 |
|---|---|---|
| JP | 2005-354550 | 12/2005 |
| JP | 2006-338637 | 12/2006 |

* cited by examiner

*Primary Examiner* — Saleh Najjar
*Assistant Examiner* — Jason Plotkin
(74) *Attorney, Agent, or Firm* — Gerald E. Hespos; Michael J. Porco; Matthew T. Hespos

(57) ABSTRACT

An authentication apparatus includes: a database section that stores a password; an entry section through which a password is entered; a storage section that stores an entered password which is entered through the entry section; an authentication section that authenticates whether the password and the entered password match with each other; and a determining section that determines whether or not a re-entered password is to be subjected to an authentication processing performed by the authentication section when the re-entered password is entered through the entry section after the authentication section determines that the password and the entered password do not match with each other.

8 Claims, 2 Drawing Sheets

AUTHENTICATION APPARATUS, AUTHENTICATION METHOD, AND COMPUTER-READABLE RECORDING MEDIUM STORING AUTHENTICATION PROGRAM

CROSS REFERENCE TO RELATED APPLICATION

This application is based on and claims the benefit of the priority of Japanese Patent application serial No. 2007-178667 filed on Jul. 6, 2007, the entire contents of which are hereby incorporated by reference.

BACKGROUND OF THE INVENTION

1. Field of the Invention

The present invention relates to an authentication apparatus, an authentication method, and a computer-readable recording medium storing an authentication program, each of which is adapted for comparing a password stored in advance in a database section and an entered password entered through an entry section.

2. Description of the Related Art

In recent years, an authentication apparatus which prompts a user to enter a password has been known in various fields such as electric equipments, e.g., a personal computer, a mobile equipment, and a mobile phone, an entrance card key system, an ATM (Automatic Teller Machine), a safety-deposit service, and the like.

Such authentication apparatus is so configured as to have an internally-provided authentication system, or an authentication server connected through an electric communication line (e.g. LAN (Local Area Network), the internet, PSTN (Public Switched Telephone Network), and the like). The authentication system and the authentication server receive a password from the authentication apparatus at each time when a password is inputted to the authentication apparatus, and then performs authentication whether or not a password stored in a database or the like matches with an entered password or a re-entered password.

If the password and the entered password do not match with each other, the authentication apparatus receives an authentication result and prompts a user to re-enter the password for authentication processing performed again by the authentication server.

At this time, even if a display section such as a monitor is provided, the entered password is not displayed on the display section in view of security. Accordingly, a user may misunderstand that he/she performed a wrong input operation at a time when the password is entered initially. Then, the user re-enters the password which is constituted by characters and signs which are the same as those included in the initially entered password.

At this time, the entered password and the re-entered password, at each time they are entered, are authenticated by the authentication system and the authentication server whether or not they match with the password stored in the database. Therefore, authentication of the initially entered password and authentication of the re-entered password require substantially equal authentication time.

Further, for setting of a password, there is a case where a prerequisite related to character entry for setting a password is set in view of system security.

The above-described prerequisite related to the character entry described above includes, for example, the number of characters (for example, entry of more than four or more than six characters is required), all one-byte characters (for example, it requires all of characters to be entered in one-byte characters), upper/lower case characters (for example, it requires all of English characters to be entered in lower-case characters), and mixed alphanumeric characters (it requires alphanumeric characters to be entered in a mixed manner).

When a user sets passwords for a plurality of authentication apparatus, he/she needs to own and use a plurality of passwords separately so that the passwords comply with respective prerequisites requested in the plurality of authentication apparatuses. However, in such a case where a user uses a plurality of passwords, when entering a password to an authentication apparatus, he/she may mistakenly enter a password which is different from an original password which should be entered. At this time, for the purpose of entering a correct password, the user may re-enter a password which is completely different from the initially entered password. Even in such case, authentication whether or not the re-entered password matches with the password stored in a database is performed at each time when the password is re-entered. Therefore, authentication for the initial password and authentication for the re-inputted password authentication require substantially equal authentication time.

It is likely that a great percentage of the authentication time mentioned above is mainly taken up by time for password verification performed in the authentication system and the authentication server or time for data communication with the authentication server through an electric communication line.

SUMMARY OF THE INVENTION

In summary, one aspect of the present invention includes an authentication apparatus including: a database section that stores a password; an entry section through which a password is entered; a storage section that stores an entered password which is entered through the entry section; an authentication section that authenticates whether the password and the entered password match with each other; and a determining section that determines whether or not a re-entered password is to be subjected to an authentication processing performed by the authentication section when the re-entered password is entered through the entry section after the authentication section determines that the password and the entered password do not match with each other.

These and other objects, features and advantages of the present invention will become more apparent upon reading of the following detailed description along with the accompanied drawings.

DESCRIPTION OF THE PREFERRED EMBODIMENTS

Next, an authentication apparatus in accordance with an embodiment of the present invention will be described with reference to the drawings.

Figure 1:
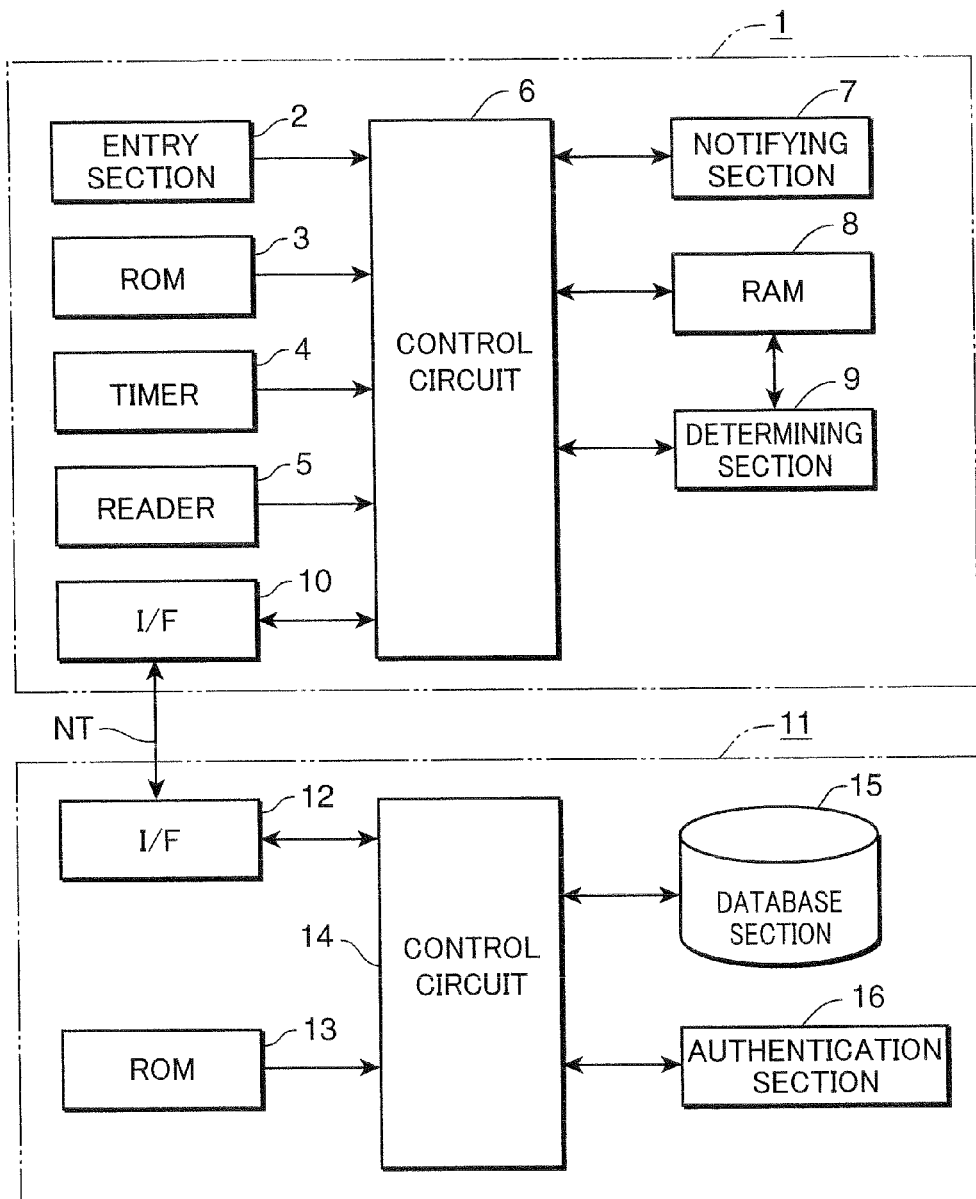
FIG. 1 is a block diagram showing an authentication apparatus in accordance with an embodiment of the present invention.
Figure 2:
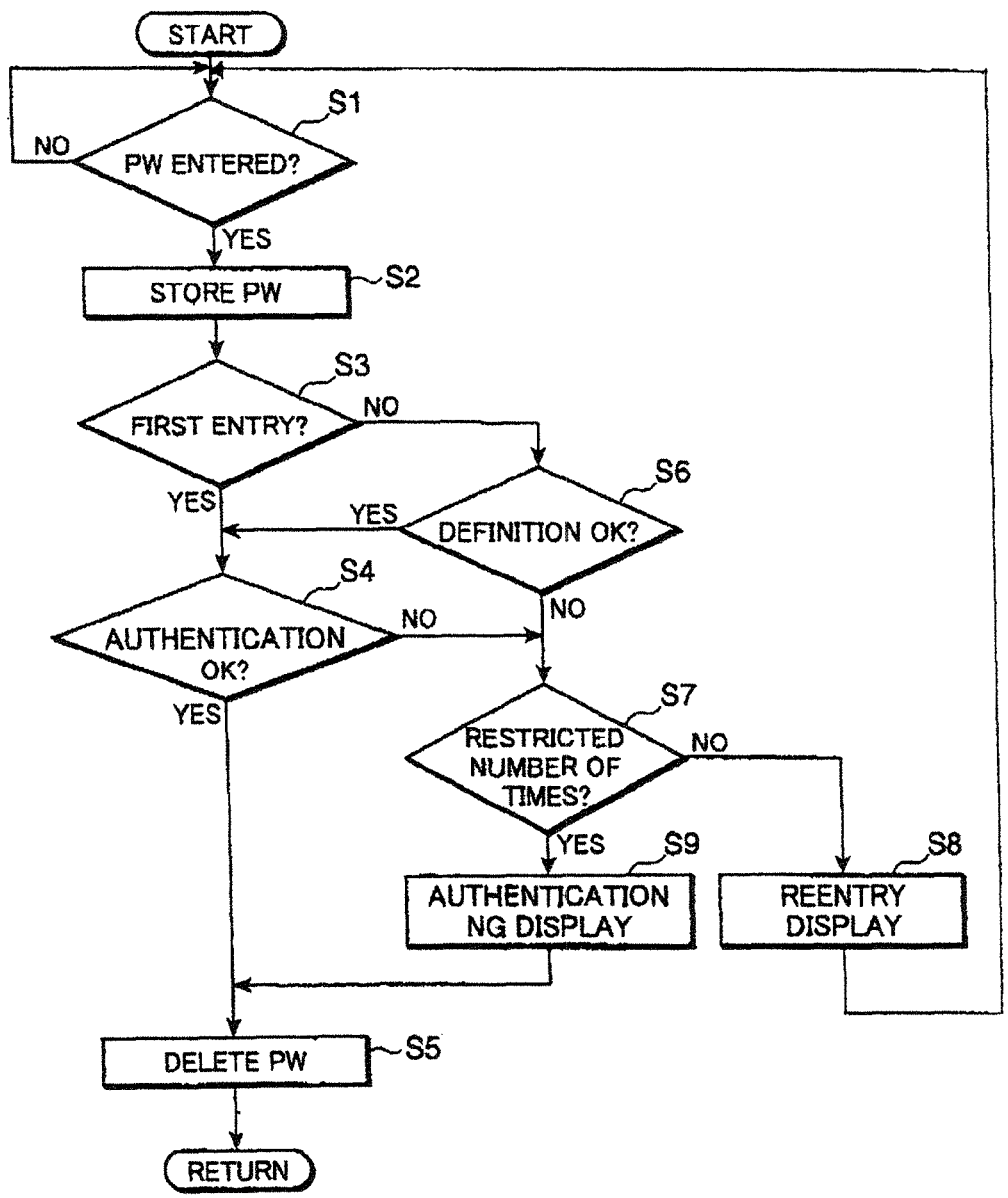
FIG. 2 is a flow diagram showing an authentication routine of the authentication apparatus in accordance with an embodiment of the present invention.

FIG. 1 is a block diagram showing the authentication apparatus in accordance with an embodiment of the present invention. FIG. 2 is a flow diagram showing an authentication routine of the authentication apparatus in accordance with an embodiment of the present invention.

As shown in FIG. 1, the authentication apparatus in accordance with an embodiment of the present invention includes a host terminal 1 and an authentication server 11. The host terminal 1 and the authentication server 11 are connected via a network NT as an electric communication line.

The host terminal 1 includes an entry section 2 such as numerical keys through which a password is entered, a ROM 3 that stores an authentication program in accordance with an embodiment of the present invention, a timer 4 for timing entry of a password, a card reader 5 that reads user information stored in a magnetic recording section, an IC chip, or the like, a control circuit (CPU) 6 that controls a re-entered password authentication processing in accordance with the authentication program stored in the ROM 3, a notifying section 7 that notifies entry or re-entry of characters corresponding to a password, a password authentication result, or the like by display or sound, a storage section 8 such as a RAM that temporarily stores the entered password entered through the entry section 2, a determining section 9 that determines the re-entered password entered through the entry section 2, and an interface section 10 for connection with the network NT.

The timer 4 may be provided as needed in accordance with a kind of an authentication apparatus. Further, the timer 4 is used that measures time at a time of aborting authentication if a password is not entered even after elapse of a predetermined time, or that measures time at a time of deleting a password stored in the storage section 8 after elapse of a predetermined time. Accordingly, for example, when a password is changed, a previous password does not remain after the changing of the password and is not approved. Further, approval and determination is not performed based on the old password at the time of determination.

The card reader 5 is used for reading user information (user name and the like) stored in a magnetic recording section, an IC (Integrated Circuit) chip, or the like attached to a card key, a membership card, an employee ID (Identification Data) card, a credit card, a cash card, and the like when, for example, the authentication apparatus is provided in a system such as a card key system, a membership electronic equipment (such as a complex machine), an ATM, or the like. Thus, when the authentication apparatus is used in systems other than these systems, the card reader 5 may be omitted.

The authentication server 11 includes an interface section 12 for connection with the network NT, a ROM 13 that stores a normal (known) authentication program, a control circuit (CPU) 14 that controls an entered password authentication processing in accordance with the authentication program stored in the ROM 13, a database section 15 that stores user information (if necessary) and a password associated with the user information, an authentication section 16 that compares the entered password entered through the entry section 2 with the password stored in the database section 15.

The control circuit 14 sets to the ROM 13 a prerequisite related to character entry of a password which is to be stored in the database section 15 in accordance with need (for example, security level). It is anticipated that the prerequisite includes the number of characters (it requires that the password is constituted by a predetermined number of characters), all one-byte characters (it requires all of characters constituting the password to be entered in one-byte characters), mixed upper/lower case characters (it requires that the password is constituted by upper/lower case characters entered in a mixed manner), mixed alphanumeric characters (it requires that the password is constituted by alphanumeric characters entered in a mixed manner), and the like. Further, when a determination result of an initially entered password is non-matching, the control circuit 14 transmits the prerequisite together with the determination result to the host terminal 1 through the network NT. In the host terminal 1, the determination result is temporarily stored in the storage section 8.

The authentication section 16 compares the entered password initially entered through the entry section 2 of the host terminal 1 with the password stored in the database section 15, and then replies a determination result (matching/non-matching) to the host terminal 1. Further, after determining that the initially entered password entered through the entry section 2 is non-matching, the authentication section 16 compares the re-entered password transmitted from the host terminal 1 with the password stored in the database section 15, and then replies a determination result (matching/non-matching) to the host terminal 1.

On the other hand, at the host terminal 1, when it is determined by the authentication section 16 that the entered password is non-matching, the determining section 9 determines whether or not the re-entered password entered through the entry section 2 falls under the definition of a subject of authentication performed by the authentication section 16 (whether or not the password is subjected to the authentication processing performed by the authentication section 16). Accordingly, the authentication section 16 performs the authentication processing limitedly for the case where the password authentication by the authentication section 16 is truly required. Therefore, it becomes unnecessary to always use the authentication section 16 when the password is inputted, so that the re-authentication time can be shortened by simplifying the password authentication.

Next, an example of the authentication control performed by the authentication apparatus in accordance with an embodiment of the present invention will be described with reference to FIG. 2. The authentication control routine shown in FIG. 2 is started from a password entry standby state after user information and a user name as specifying information are obtained, or from a direct password entry standby state.
(Step S1)

In Step S1, the control circuit 6 waits for entry of a password through the entry section 2. When the password is entered, the routine proceeds to Step S2. When the password is not entered, the control circuit 6 continues to monitor entry of the password in Step S1. In a case where the timer 4 is used, and the password is not entered after elapse of a predetermined time, the authentication control routine is terminated. Further, including subsequent routine, the authentication routine is also terminated if any aborting operation (for example, operations of taking out a card from the card reader 5 or aborting of the entry section 2, or the like) is performed.
(Step S2)

In Step S2, the control circuit 6 allows the entered password entered through the entry section 2 to be stored in the storage section 8, and then the routine proceeds to Step S3.
(Step S3)

In Step S3, the control circuit 6 determines whether or not entry of a password entered through the entry section 2 is the first entry. If it is the first, the routine proceeds to Step S4. If it is the second or later entry, the routine proceeds to Step S6. In the case where the entry is the second or later entry, and a limitation in the times of entry (for example, three times) is provided, the control circuit 6 counts the number of entries and stores the same to the storage section 8.
(Step S4)

In Step S4, the control circuit 14 controls the authentication section 16 to compare the password stored in the database section 15 (hereinafter, stored password) with the entered password transmitted from the host terminal 1 so as to determine whether or not the passwords match with each other. When the stored password and the entered password match with each other (authentication OK), the routine proceeds to Step S5. When the stored password and the entered password do not match with each other (authentication NG), the routine proceeds to Step S7.

(Step S5)

In Step S5, the control circuit 6, in accordance with the authentication OK in Step S4, deletes the entered password stored in the storage section 8 (including re-entered password entered at the second or later time), and then the routine proceeds to the next step (loops back to Step S1 in the authentication control routine).

(Step S6)

In Step S6, the control circuit 6, at the second later time of entry of the password, controls the determining section 9 to determine whether the re-entered password falls under the definition of the subject of authentication performed by the authentication section 16.

In particular, in accordance with the authentication program stored in the ROM 3, the determining section 9 compares the password stored in the storage section 8 with the re-entered password entered through the entry section 2 so as to determine whether or not the passwords match with each other. If the entered password and the re-entered password do not match with each other, the routine proceeds to Step S4. If the entered password and the re-entered password match with each other, the routine proceeds to Step S7.

At this time, in accordance with the authentication program stored in the ROM 3, the control circuit 6 controls the determining section 9 to determine whether or not the password satisfies the prerequisite set in the ROM 13 and related to the character entry. If the prerequisite is satisfied, the routine proceeds to Step S4. If the prerequisite is not satisfied, the routine proceeds to Step S7.

For example, when the password set and stored in the database section 15 is "Arigato", and the initially entered password is "arigato", the authentication server 11 determines that the passwords do not match with each other (Step S4).

Here, when the re-entered password entered by a user is, for example, "arigato", the determining section 9 determines that the initial entered password and the re-entered password are the same (example of NO in Step S6). Then, the determining section 9 determines in advance as the authentication NG without authentication performed by the authentication section 16. In other words, the determining section 9 determines that the re-entered password entered through the entry section 2 does not fall under the subject of the definition of authentication performed by the authentication section 16 (not allow the re-entered password to be subjected to the authentication processing performed by the authentication section 16), so that authentication is not performed by the authentication section 16.

Further, when mixing of upper case characters and lower case characters is set as the prerequisite of the password in the ROM 13, and the initially entered password is "arigato", and the re-entered password is, for example, "arigatou", while the initial entered password and the re-entered password are different from one another, the determining section 9 determines that the re-entered password does not include upper case characters and lower case characters which are in a mixed manner, in other words, there exists no upper case "A" in this example (example of NO in Step S6). Then, the determining section 9 determines in advance as the authentication NG without authentication performed by the authentication section 16.

Further, when the number of characters is set as a prerequisite of the password in the ROM 13, and the initially entered password is "arigato", and the re-entered password is, for example, "arigatou", while the initial entered password and the re-entered password are different from one another, the determining section 9 determines that the password set and stored in the database section 15 is "Arigato" having seven characters and the re-entered password is "arigatou" having eight characters, and thus the numbers of characters do not match. Then, the determining section 9 determines in advance as the authentication NG without authentication performed by the authentication section 16 (example of NO in Step S6).

Further, as another example, when all one-byte characters is set as a prerequisite of the password in the ROM 13, and the password set and stored in the database section 15 is "Arigato" (all constituted by one-byte characters), and the initially entered password is "arigato" (all constituted by two-byte characters), and the re-entered password is, for example, "arigatou" (all constituted by two-byte characters), while the initially entered password and the re-entered password are different from one another, the re-entered password "arigatou" includes characters all constituted by two-byte characters, and not characters all constituted by two-byte characters. Therefore, the determining section 9 determines in advance as the authentication NG without authentication performed by the authentication section 16.

Further, as another example, when mixed alphanumeric characters is set in the ROM 13 as a prerequisite of the password, and the password set and stored in the database section 15 is "Arigato3", and the initial entered password is "arigato", and the re-entered password is, for example, "arigatou", even if the initially entered password and the re-entered password are different from one another, the re-entered password "arigatou" does not included alphanumeric characters in a mixed manner. Therefore, the determining section 9 determines in advance as the authentication NG without authentication performed by the authentication section 16 (example of NO in Step S6).

When the determining section 9 determines that the re-entered password satisfies the prerequisite (YES in Step S6), the routine proceeds to the processing of Step S4. In Step S4, the control circuit 14 controls the authentication section 16 to compare the password stored in the database section 15 with the re-entered password transmitted from the host terminal 1, and determine whether or not the password and the re-entered password match with each other. If the password and the re-entered password match with each other (authentication OK), the routine proceeds to Step S5. If the password and the re-entered password do not match with each other, the routine proceeds to Step S7.

(Step S7)

In Step S7, in accordance with re-entry of password at the second time or later, the control circuit 6 confirms the number of times the password is re-entered. If the number reaches the restricted number, the routine proceeds to Step S9. If the number does not reach the limited number, the routine proceeds to Step S8.

(Step S8)

In Step S8, the control circuit 6 stores the second re-entered password into the storage section 8 and controls the notifying section 7 to perform display of prompting re-entry of password or make a sound of password error. Then, the routine loops back to Step S1.

(Step S9)

In Step S9, since none of the passwords entered for the predetermined limited times did not match with the password stored in the database section 15, the control circuit 6 controls the notifying section 7 to perform display of the authentication NG or make a sound. Then, the routine proceeds to Step S5.

When, in addition to completion of authentication (authentication OK) in Step S4, operations of forcedly terminating the authentication control routine, e.g. count-up of the timer 4, taking out a card from the card reader 5, abort operation through the entry section 2, and the like, the routine described above forcedly terminates the authentication control routine after performing a processing of deleting the entered password and the like from the storage section 8 (Step S5).

As described above, according to the authentication apparatus in accordance with an embodiment of the present invention, if the re-entered (or latterly re-entered) password matches with the initially entered password (or re-entered password) or the like, authentication of the password is not performed in the authentication section 16, and the determining section 9 determines in advance as the authentication NG. Accordingly, the authentication time can be shortened.

Meanwhile, although the host terminal 1 and the authentication server 11 are connected via the network NT in the above-described embodiment, it may be so configured that the host terminal 1 internally includes an authentication system which serves similarly as the authentication server 11, and the host terminal 1 may be connected to the authentication system through a bus.

Further, an authentication apparatus in accordance with the present invention is not limited to the above-described embodiment. It may be applied generally to an authentication apparatus which receives re-entry of password and authenticates the same when the password entered through the entry section such as numerical keys does not match with the password stored in the database section.

The authentication program is provided through a computer-readable recording medium such as a ROM, a hard disk, a flexible disk, a memory card, a magnet-optical disk, or the like.

The authentication program is read from the computer-readable recording medium into the authentication apparatus, so that commands are transmitted to the constituting parts of the authentication apparatus to execute functions associated with the constituting parts.

In the embodiment described above, the present invention is described as being applied to an authentication apparatus. However, it may be applied as a password authentication method including the processing shown in the authentication control routine described above.

Summary of the embodiment described above is as described herebelow. In other words, one aspect of the present invention includes an authentication apparatus including: a database section that stores a password; an entry section through which a password is entered; a storage section that stores an entered password which is entered through the entry section; an authentication section that authenticates whether the password and the entered password match with each other; and a determining section that determines whether or not a re-entered password is to be subjected to an authentication processing performed by the authentication section when the re-entered password is entered through the entry section after the authentication section determines that the password and the entered password do not match with each other.

Further, according to another aspect of the present invention, the determining section determines that the re-entered password is not to be subjected to the authentication processing performed by the authentication section when the entered password and the re-entered password match with each other.

Further, according to another aspect of the present invention, the database section sets, at a time when the password is set, a prerequisite of at least one of the number of characters, all one-byte/two-byte characters, upper/lower case characters, and mixed alphanumeric characters to the password as a prerequisite related to character entry, and stores the password, and when the re-entered password does not satisfy the prerequisite, the determining section determines that the re-entered password is not to be subjected to the authentication processing performed by the authentication section.

Further, according to another aspect of the present invention, the database section sets, at a time when the password is set, a prerequisite of the number of characters to the password as a prerequisite related to character entry, and stores the password, and when the number of characters included in the re-entered password does not match with the number of characters of the prerequisite, the determining section determines that the re-entered password is not to be subjected to the authentication processing performed by the authentication section.

Further, according to another aspect of the present invention, the database section sets, at a time when the password is set, a prerequisite of all one-byte characters to the password as a prerequisite related to character entry, and stores the password, and when the re-entered password is not entered in all one-byte characters, the determining section determines that the re-entered password is not to be subjected to the authentication processing performed by the authentication section.

Further, according to another aspect of the present invention, the database section sets, at a time when the password is set, a prerequisite of mixed upper/lower case characters to the password as a prerequisite related to character entry, and stores the password, and when the re-entered password is not entered in upper/lower case characters in a mixed manner, the determining section determines that the re-entered password is not to be subjected to the authentication processing performed by the authentication section.

Further, according to another aspect of the present invention, the database section sets, at a time when the password is set, a prerequisite of mixed alphanumeric characters to the password as a prerequisite related to character entry, and stores the password, and when the re-entered password is not entered in mixed alphanumeric characters, the determining section determines that the re-entered password is not to be subjected to the authentication processing performed by the authentication section.

Further, according to another aspect of the present invention, the authentication section is configured as an equipment which is separate from the determining section, and the determining section and the authentication section are connected through an electric communication line.

Further, another aspect of the present invention includes an authentication method including the steps of: storing an entered password entered to an entry section; authenticating whether a password stored in a database section and the entered password match with each other; and determining whether or not a re-entered password is to be subjected to an authentication processing performed by the authentication section when a re-entered password is entered to the entry section after it is determined that the password and the entered password do not match with each other.

Further, another aspect of the present invention includes a computer-readable recording medium storing an authentication program for allowing a computer to function so as to execute the steps of: storing an entered password entered to an entry section; authenticating whether a password stored in a database section and the entered password match with each other; and determining whether or not a re-entered password is to be subjected to an authentication processing performed by the authentication section when a re-entered password is entered to the entry section after it is determined that the password and the entered password do not match with each other.

According to an authentication apparatus in accordance with the, when a user re-enters password to the entry section, the authentication time necessary for authenticating whether or not the re-entered password matches with a pre-registered valid password can be shortened.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An authentication apparatus comprising:
   a host terminal; and
   an authentication server that is connected to the host terminal through an electric communication line;
   the host terminal comprising:
      an entry section through which a first entered password is entered; and
      a storage section that stores the first entered password that is entered through the entry section;
   the authentication server comprising:
      a database section that stores a stored password; and
      an authentication section that authenticates whether the password stored in the database section and the first entered password match with each other; and
      when the authentication section determines that first entered password and the stored password do not match, the entry section enables a second entered password to be entered and the storage section stores the second entered password that is entered through the entry section;
   the host terminal further comprising:
      a determining section that determines whether the second entered password and the first entered password match with each other, and
      wherein the authentication section does not perform the authentication processing to the second entered password when the determining section determines that the second entered password and the first entered password match with each other, and authenticates whether the second entered password and the stored password match with each other when the determining section determines that the second entered password and the first entered password do not match with each other.

2. The authentication apparatus according to claim 1, wherein:
   the database section stores the password including a prerequisite related to character entry, the prerequisite being selected from the group consisting of the number of characters, all one-byte/two-byte characters, upper/lower case characters, and mixed alphanumeric, and
   when the second entered password does not satisfy the prerequisite, the determining section determines that the second entered password is not to be subjected to the authentication processing performed by the authentication section.

3. The authentication apparatus according to claim 1, wherein:
   the database section sets, at a time when the password is set, a prerequisite of the number of characters to the password as a prerequisite related to character entry, and stores the password, and
   when the second entered password does not match with the number of characters of the prerequisite, the determining section determines that the second entered password is not to be subjected to the authentication processing performed by the authentication section.

4. The authentication apparatus according to claim 1, wherein
   the database section sets, at a time when the password is set, a prerequisite of all one-byte characters to the password as a prerequisite related to character entry, and stores the password, and
   when the second entered password is not entered in all one-byte characters, the determining section determines that the re-entered password is not to be subjected to the authentication processing performed by the authentications section.

5. The authentication apparatus according to the claim 1, wherein:
   the database section sets, at a time when the password is set, a prerequisite of mixed upper/lower case characters to the password as a prerequisite related to character entry, and stores the password, and
   when the second entered password is not entered in upper/lower case characters in a mixed manner, the determining section determines that the second entered password is not to be subjected to the authentication processing performed by the authentication section.

6. The authentication apparatus according to claim 1, wherein:
   the database section sets, at a time when the password is set, a prerequisite of mixed alphanumeric characters to the password as a prerequisite related to character entry, and stores the password, and
   when the second entered password is not entered in mixed alphanumeric characters, the determining section determines that the second entered password is not to be subjected to the authentication processing performed by the authentication section.

7. An authentication method comprising the steps of:
   a first storing step that stores first entered password to an entry section in a host terminal;
   an authenticating step that authenticates whether a password stored in a database section and the first entered password match with each other in an authentication server connected to the host terminal through an electric communication line;
   a second storing step that stores a second entered password entered to the entry section; and
   a determining step that determines whether the second entered password and the first entered password match with each other;
   wherein the authenticating step does not perform the authentication processing to the second entered password when the determining step determines that the second entered password and the first entered password match with each other, and authenticates whether the second entered password and the stored password match with each other when the determining step determines that the second entered password and the first entered password do not match with each other.

8. A computer-readable non-transitory recording medium storing an authentication program for allowing a computer to function so as to execute the steps of:

a storing step that stores first entered password to an entry section in a host terminal;

an authenticating step that authenticates whether a password stored in a database section and the first entered password match with each other in an authentication server connected to the host terminal through an electric communication line;

a second storing step that stores a second entered password entered to the entry section; and a determining step that determines whether the second entered password and the first entered password match with each other;

wherein the authenticating step does not perform the authenticating processing to the second entered password when the determining step determines that the second entered password and the first entered password match with each other, and authenticates whether the second entered password and the stored password match with each other when the determining step determines that the second entered password and the first entered password do not match with each other.

* * * * *